(12) United States Patent
Wang

(10) Patent No.: US 10,524,266 B2
(45) Date of Patent: Dec. 31, 2019

(54) SWITCHING TRANSMISSION TECHNOLOGIES WITHIN A SPECTRUM BASED ON NETWORK LOAD

(71) Applicant: Google LLC, Mountain View, CA (US)

(72) Inventor: Jibing Wang, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/788,948

(22) Filed: Oct. 20, 2017

(65) Prior Publication Data

US 2019/0124664 A1 Apr. 25, 2019

(51) Int. Cl.
| | | |
|---|---|---|
| *H04W 72/04* | (2009.01) | |
| *H04W 28/08* | (2009.01) | |
| *H04W 74/02* | (2009.01) | |
| *H04W 36/22* | (2009.01) | |
| *H04W 28/02* | (2009.01) | |

(Continued)

(52) U.S. Cl.
CPC ....... *H04W 72/0486* (2013.01); *H04W 28/08* (2013.01); *H04W 36/22* (2013.01); *H04W 74/02* (2013.01); *H04L 47/125* (2013.01); *H04W 16/14* (2013.01); *H04W 24/10* (2013.01); *H04W 28/0289* (2013.01); *H04W 72/0453* (2013.01); *H04W 88/10* (2013.01)

(58) Field of Classification Search
CPC . H04W 72/0486; H04W 28/08; H04W 36/22; H04W 72/0453; H04W 24/10; H04W 16/14
See application file for complete search history.

(56) References Cited

U.S. PATENT DOCUMENTS

| | | | |
|---|---|---|---|
| 2015/0065133 A1* | 3/2015 | Cui | H04W 36/22 |
| | | | 455/436 |
| 2016/0014664 A1 | 1/2016 | Singh et al. | |

(Continued)

FOREIGN PATENT DOCUMENTS

| | | |
|---|---|---|
| WO | WO 2013/179095 | 12/2013 |
| WO | WO 2016/184277 | 11/2016 |

OTHER PUBLICATIONS

Qualcomm Technologies, Inc. "Progress on LAA and its relationship to LTE-U and MulteFire," Presentation, Qualcomm Technologies, Feb. 22, 2016, 33 pages.

(Continued)

*Primary Examiner* — Chuong A Ngo
(74) *Attorney, Agent, or Firm* — Colby Nipper PLLC

(57) ABSTRACT

Methods, systems, and apparatus, including computer programs encoded on a computer storage medium, for switching between transmission technologies within a spectrum based on network load. In one aspect, a method includes obtaining network load information that indicates network load for a first access point operating using frequency domain multiplexing in a first spectrum and network load for a second operator using frequency domain multiplexing in a second spectrum that does not overlap any portion of the first spectrum, determining that the network load information satisfies a network load threshold, and in response to determining that the network load information satisfies the network load threshold, providing an instruction to the first access point to operate using LBT in a third spectrum the includes at least a portion of the first spectrum and at least a portion of the second spectrum.

20 Claims, 3 Drawing Sheets

(51) Int. Cl.
*H04W 88/10* (2009.01)
*H04L 12/803* (2013.01)
*H04W 16/14* (2009.01)
*H04W 24/10* (2009.01)

(56) References Cited

U.S. PATENT DOCUMENTS

| | | |
|---|---|---|
| 2016/0119846 A1 | 4/2016 | Chou et al. |
| 2017/0142592 A1 | 5/2017 | Fischer et al. |
| 2017/0295578 A1* | 10/2017 | Khoshnevisan ...... H04L 5/0032 |
| 2018/0027419 A1* | 1/2018 | Xu ........................ H04W 16/14 455/454 |
| 2018/0124612 A1* | 5/2018 | Babaei ................. H04W 16/14 |
| 2018/0139615 A1 | 5/2018 | Cui et al. |
| 2018/0176955 A1* | 6/2018 | Salem ................... H04W 16/14 |

OTHER PUBLICATIONS

Xiao et al. "An Adaptive Channel Access Mechanism for LTE-U and WiFi Coexistence in an Unlicensed Spectrum," IEEE ICC 2016 Next-Generation Networking and Internet Symposium, May 22, 2016, 6 pages.

PCT International Search Report and Written Opinion issued in International Application No. PCT/US2018/043887, dated Nov. 6, 2018, 17 pages.

"Written Opinion of the International Preliminary Examining Authority", PCT Application No. PCT/US2018/043887, dated Sep. 30, 2019, 9 pages.

* cited by examiner

SWITCHING TRANSMISSION TECHNOLOGIES WITHIN A SPECTRUM BASED ON NETWORK LOAD

FIELD

This specification relates to data transmission.

BACKGROUND

Networks can communicate using a variety of different technologies. For example, Global System for Mobile Communication (GSM), IEEE 802.11, 3G are all different technologies that can be used for wireless communication within a network.

SUMMARY

In general, an aspect of the subject matter described in this specification may involve a process for switching between transmission technologies within a spectrum based on network load. In a shared spectrum, for example the Citizens Broadband Radio Server (CBRS), multiple different techniques for wireless transmission may be used by different operators. For example, Time Division Long-Term Evolution (TD-LTE) may be used by one carrier in a first portion of the spectrum and Listen Before Talk (LBT) may be used by another carrier in a second different portion of the spectrum.

As an example using particular technologies, between TD-LTE and LBT technologies, there may be no technology that is universally better than the other one in all scenarios. LBT may perform better than TD-LTE under low network load and TD-LTE may perform better than LBT under high network load. This may be due to an increase in overhead from packet random backoff in LBT corresponding to an increase in network load, making LBT less efficient than TD-LTE once network load gets high enough. Accordingly, there may be spectrum efficiency loss when using either technology in a certain non-desired scenario. For example, there may be spectrum efficiency loss in using LBT under high network load instead of using TD-LTE and using TD-LTE under low network load instead of using LBT.

Dynamically switching between the two technologies based on network load may improve spectrum efficiency loss by limiting the use of each of the technologies in non-desired scenarios. Accordingly, a system may decrease spectrum efficiency loss by monitoring network load and dynamically switching between different transmission technologies based on the network load. The system may consider network load in terms of a number of factors including one or more of number of connected devices, physical resource block utilization, physical downlink control channel utilization, packet collision probability, packet random backoff, and other factors.

In general, one innovative aspect of the subject matter described in this specification is embodied in methods that include the actions of obtaining network load information that indicates network load for a first access point operating using frequency domain multiplexing in a first spectrum and network load for a second operator using frequency domain multiplexing in a second spectrum that does not overlap any portion of the first spectrum, determining that the network load information satisfies a network load threshold, and in response to determining that the network load information satisfies the network load threshold, providing an instruction to the first access point to operate using listen before talk (LBT) in a third spectrum the includes at least a portion of the first spectrum and at least a portion of the second spectrum.

Other implementations of these aspects include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in certain aspects, determining that the network load information satisfies a network load threshold includes determining that a number of devices connected to the first access point satisfies a predetermined number. In some aspects, determining that the network load information satisfies a network load threshold includes determining that a utilization of physical resource blocks satisfies a predetermined percentage. In some implementations, determining that the network load information satisfies a network load threshold includes determining that utilization of a physical downlink control channel satisfies a predetermined percentage.

In certain aspects, using LBT in a third spectrum includes using LBT across an entirety of the first spectrum and the second spectrum. In some aspects, the third spectrum is between 3550 GHz and 3700 GHz. In some implementations, using frequency domain multiplexing includes using TD-LTE and using LBT comprises using Carrier Sense Multiple Access (CSMA). In certain aspects, the first access point is operated by a first carrier and the second access point is operated by the second carrier. In some aspects, actions include providing an instruction to the second access point to operate using LBT in the third spectrum.

In some implementations, actions include obtaining network load information that indicates network load for the first access point operating using LBT in the third spectrum and network load for the second operator using LBT in the third spectrum, determining that the network load information satisfies a second network load threshold, and in response to determining that the network load information satisfies a second network load threshold, providing a second instruction to the first access point to operate using frequency domain multiplexing in the first spectrum.

In certain aspects, determining that the network load information satisfies a second network load threshold includes determining that a number of devices connected to the first access point satisfies a predetermined number. In some aspects, determining that the network load information satisfies a second network load threshold includes determining that a utilization of physical resource blocks satisfies a predetermined percentage. In some implementations, determining that the network load information satisfies a second network load threshold includes determining that utilization of a physical downlink control channel satisfies a predetermined percentage.

In certain aspects, determining that the network load information satisfies a second network load threshold includes determining that packet collision probability satisfies a predetermined probability. In some aspects, determining that the network load information satisfies a second network load threshold includes determining that packet random backoff satisfies a predetermined length of time.

Particular embodiments of the subject matter described in this specification can be implemented so as to realize one or more of the following advantages. By switching technologies within a spectrum based on network load, the system may decrease spectrum efficiency loss and increase network spectrum efficiency. Decrease in spectrum efficiency and increase in network efficiency may result in both a reduction in latency and an increase in throughput in communications between devices within the network all without using additional spectrum.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
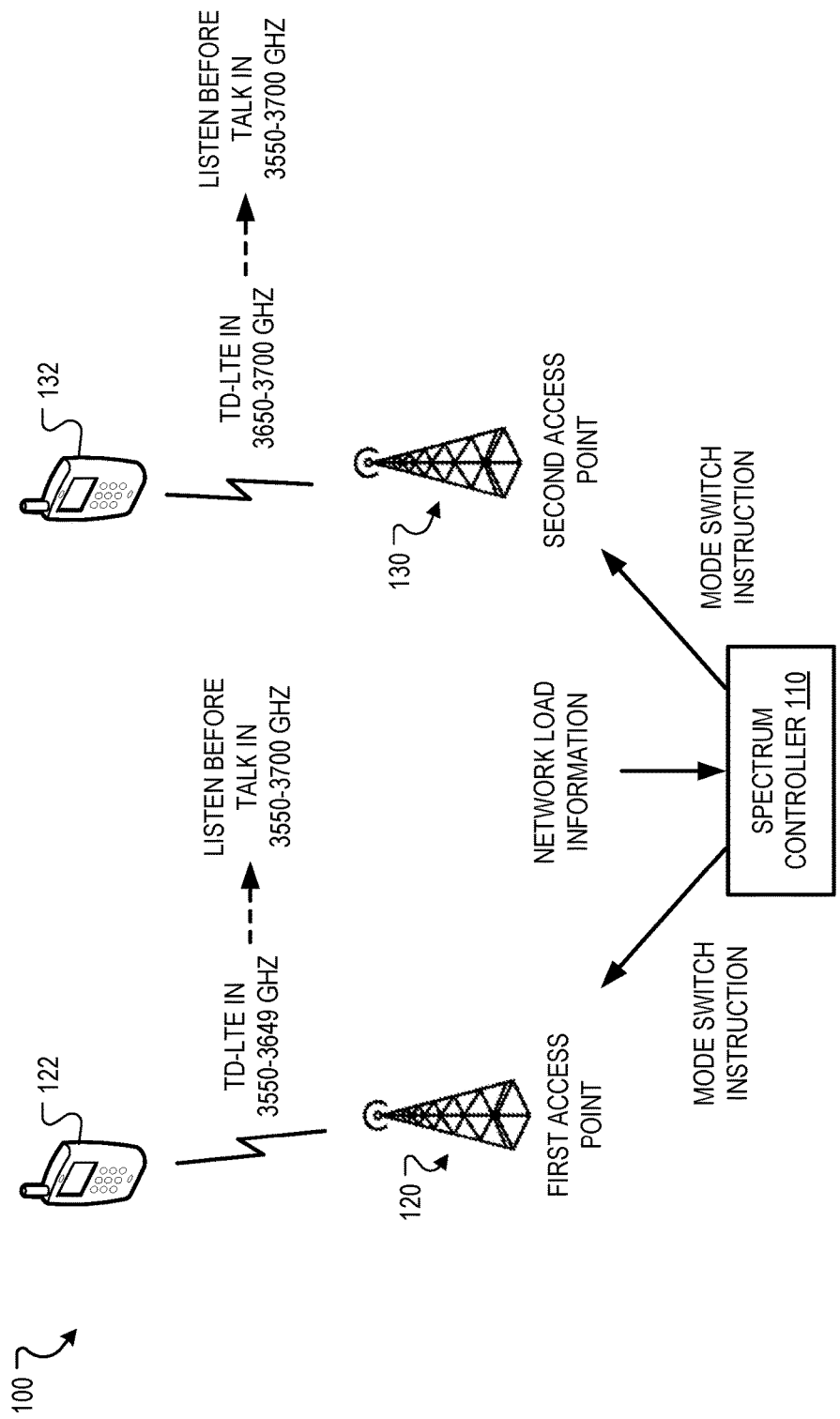
FIG. 1 illustrates a block diagram of an example system that switches between transmission technologies within a spectrum based on network load.

FIG. 1 illustrates a diagram of an example system 100 that switches between transmission technologies within a spectrum based on network load. Briefly, and as described in further detail below, the system 100 includes a first access point 120, a first user equipment 122, a second access point 130, a second user equipment 132, and a spectrum controller 110.

The first access point 120 may include one or more transceivers to send and receive wireless transmissions between user equipment. For example, the first access point 120 may be a base station of a first carrier that sends and receives wireless transmissions between the first user equipment 122. The first user equipment 122 may be a device that sends and receives wireless transmission using one or more transceivers. For example, the first user equipment 122 may include a mobile computing device, a laptop, a tablet, a smart watch, a mobile hotspot device.

The first access point 120 may receive instructions from the spectrum controller 110 that indicate whether the first access point 120 should use frequency domain multiplexing or LBT for communications with user equipment and within what frequency range the first access point 120 should use. For example, the first access point 120 may obtain a mode switch instruction from the spectrum controller 110 that indicates the first access point 120 should use LBT in a frequency range of 3550-3700 GHz and in response, then switch from using TD-LTE in a frequency range of 3550-3649 GHz to using LBT in the frequency range of 3550-3700 GHz.

Frequency domain multiplexing may involve dividing bandwidth available in a communication medium into a series of non-overlapping frequency sub-bands, each of which is used to carry a separate signal. For example, the first access point 120 may communicate with the first user equipment 122 between a frequency of 3550-3555 GHz and communicate with another user equipment between a non-overlapping frequency of 3556-3560 GHz. TD-LTE may be a form of frequency domain multiplexing.

LBT may involve transmissions across an entire frequency range. For example, the first access point 120 may communicate with the first user equipment 122 between a frequency range of 3550-3700 GHz and with another user equipment also between the frequency range of 3550-3700 GHz. Use of the same frequency range is possible in LBT as a device may determine whether another device is already transmitting prior to transmitting. If no other device is transmitting, the device transmits. If another device is transmitting, the device determines there is a collision and waits a random amount of time up to a maximum length of time, the length of time waited referred to as a collision backoff time and the maximum length of time referred to as a packet random backoff, before attempting to transmit again. The more times the device needs to wait to transmit, i.e., the more collisions, the more the device increases the packet random backoff. Carrier Sense Multiple Access (CSMA) may be a form of LBT.

Similarly, the second access point 130 may include one or more transceivers to send and receive wireless transmissions between user equipment. For example, the second access point 130 may be a base station of a second carrier that sends and receives wireless transmissions between the second user equipment 132. The second user equipment 132 may be a device that sends and receives wireless transmission using one or more transceivers. For example, the second user equipment 132 may include a mobile computing device, a laptop, a tablet, a smart watch, a mobile hotspot device.

The second access point 130 may receive instructions from the spectrum controller 110 that indicate whether the second access point 130 should use frequency domain multiplexing or LBT for communications with user equipment and within what frequency range the second access point 130 should use. For example, the second access point 130 may obtain a mode switch instruction from the spectrum controller 110 that indicates the second access point 130 should use LBT in a frequency range of 3550-3700 GHz and in response, then use LBT in that frequency range.

The spectrum controller 110 may control allocation of spectrum used by the first access point 120 and the second access point 130. For example, the spectrum controller 110 may instruct the first access point 120 to communicate with the first user equipment 122 using the frequency range of 3550-3649 Gigahertz (GHz) and instruct the second access point 130 to communicate with the second user equipment 132 using the frequency range of 3650-3700 GHz. Additionally or alternatively, the controller 110 may control communication technology used by the first access point 120 and the second access point 130. For example, the spectrum controller 110 may instruct the first access point 120 to switch from using frequency domain multiplexing to using LBT.

The spectrum controller 110 may control the spectrum and the communication technology that the first access point 120 and the second access point 130 use to increase network transmission efficiency. For example, the spectrum controller 110 may instruct the first access point 120 and the second access point 130 to use TD-LTE within different respective frequency ranges under network load conditions where TD-LTE will perform better than LBT. In another example, the spectrum controller 110 may instruct the first access point 120 and the second access point 130 to use LBT across the same frequency range under network load conditions where LBT will perform better than TD-LTE.

The spectrum controller 110 may control the spectrum and the communication technology that the first access point 120 and the second access point 130 based at least on determining network load information satisfies a network load threshold. The network load information may indicate network load for the first access point 120 and the second access point 130. For example, as shown in FIG. 1, initially the first access point 120 and first user equipment 122 are communicating using TD-LTE in a frequency range of 3550-3649 GHz and the second access point 130 and second user equipment 132 are communicating using TD-LTE in a frequency range of 3650-3700 GHz. The spectrum controller 110 obtains network load information, determines that the network load information satisfies a network load threshold, and, in response, then transmits mode switch instructions to both the first access point 120 and the second access point 130 that causes the first access point 120 and the second access point 130 to both switch to using LBT in a frequency range of 3550-3700 GHz.

Satisfaction of the network load threshold may indicate that LBT provides more network spectrum efficiency than frequency domain multiplexing and non-satisfaction of the network load threshold may indicate that frequency domain multiplexing provides more network spectrum efficiency than LBT. For example, the spectrum controller 110 may determine that based at least on obtain network load information, TD-LTE will perform better. In response, spectrum controller 110 may determine non-overlapping frequency ranges for each access point and instruct each of the access points to use TD-LTE within the determined corresponding frequency ranges. In another example, the spectrum controller 110 may determine that based at least on obtain network load information, LBT will perform better. In response, spectrum controller 110 may determine combine non-overlapping frequency ranges for each access point into a single frequency range, that may or may not be contiguous, and instruct each of the access points to use LBT within the single frequency range.

The network load information may include one or more of number of devices connected to each access point, utilization of physical resource blocks, utilization of physical downlink control channel, a packet collision probability, and a packet random backoff. A physical resource block may refer to a smallest unit of allocation for a communication in a particular communication technology. A physical downlink control channel may be a channel with a fixed capacity that includes control information for LTE. A packet collision probability may refer to a probability that when a device using LBT wants to transmit another device will be transmitting.

The spectrum controller 110 may determine that the network load information satisfies a network load threshold based on determining that a number of devices connected to the first access point satisfies a predetermined number. For example, the spectrum controller 110 may determine that two user equipment are in communication with the first access point 120 which is less than a predetermined number of five, ten, fifteen, or some other number, and, in response, determine the network load threshold is satisfied. In another example, the spectrum controller 110 may determine that one hundred user equipment are in communication with the first access point 120 which is not less than a predetermined number of five, ten, fifteen, or some other number, and, in response, determine the network load threshold is not satisfied.

The spectrum controller 110 may determine that the network load information satisfies a network load threshold based on determining that a utilization of physical resource blocks satisfies a predetermined percentage. For example, the spectrum controller 110 may determine that less than ten, fifteen, twenty, or some other predetermined percentage of physical resource blocks are being used and, in response, determine that the network load information satisfies a network load threshold. In another example, the spectrum controller 110 may determine that equal to or more than ten, fifteen, twenty, or some other predetermined percentage of physical resource blocks are being used and, in response, determine that the network load information does not satisfy a network load threshold.

The spectrum controller 110 may determine that the network load information satisfies a network load threshold based on determining that utilization of a physical downlink control channel satisfies a predetermined percentage. For example, the spectrum controller 110 may determine that less than ten, fifteen, twenty, or some other predetermined percentage of a physical downlink control channel is being utilized and, in response, determine that the network load information satisfies a network load threshold. In another example, the spectrum controller 110 may determine that equal to or more than ten, fifteen, twenty, or some other predetermined percentage of a physical downlink control channel are being used and, in response, determine that the network load information does not satisfy a network load threshold.

While the above may describe determining that network load information satisfies a network load threshold for switching from using frequency domain multiplexing to LBT, similar thresholds may be used for switching from LBT to frequency domain multiplexing. For example, instead of determining whether less than a predetermined number of five, ten, fifteen, or some other number of user equipment is in communication with the first access point 120, the spectrum controller may determine more than a predetermined number of five, ten, fifteen, or some other number of user equipment is in communication with the first access point 120 and, in response, determine a network load threshold for switching from LBT to TD-LTE is satisfied.

The spectrum controller 110 may determine that the network load information satisfies a network load threshold based on determining that packet collision probability satisfies a predetermined probability. For example, the spectrum controller 110 may determine that a packet collision probability is greater than ten, fifteen, twenty, or some other predetermined percentage and, in response, determine that the network load information satisfies a network load threshold. In another example, the spectrum controller 110 may determine that a packet collision probability is not greater than ten, fifteen, twenty, or some other predetermined percentage and, in response, determine that the network load information does not satisfy a network load threshold.

The spectrum controller 110 may determine that the network load information satisfies a network load threshold based on determining that packet random backoff satisfies a predetermined length of time. For example, the spectrum controller 110 may determine that a packet random backoff is greater than four, five, six hundred milliseconds, or some other predetermined length of time and, in response, determine that the network load information satisfies a network load threshold. In another example, the spectrum controller 110 may determine that a packet random backoff is not greater than four, five, six hundred milliseconds, or some other predetermined length of time and, in response, determine that the network load information does not satisfy a network load threshold.

In some implementations, the spectrum controller 110 may separately determine whether the network load information satisfies a network load threshold for switching transmission technology to both the first access point 120 and second access point 130 and only determine that there is a satisfaction when the network load threshold is satisfied for each access point separately. For example, the spectrum controller 110 may determine that while the first access point 120 has fewer than fifty user equipment connected, the second access point 130 has more than fifty user equipment connected, so determine that the network threshold is not satisfied. In another example, the spectrum controller 110 may determine that the first access point 120 has fewer than fifty user equipment connected and the second access point 130 has fewer than fifty user equipment connected, so determine that the network threshold is satisfied.

In some implementations, the spectrum controller 110 determines that the network load information satisfies a network load threshold based on one or more of number of devices connected to each access point, utilization of physical resource blocks, utilization of physical downlink control channel, a packet collision probability, and a packet random backoff. For example, the spectrum controller 110 may assign a weight to each of these factors, determine a score based on the weights, and determine that the network load information satisfies a network load threshold if the score satisfies a score threshold.

Different configurations of the system 100 may be used where functionality of the first access point 120, a first user equipment 122, a second access point 130, a second user equipment 132, and a spectrum controller 110 may be combined, further separated, distributed, or interchanged. For example, the spectrum controller 110 may be incorporated into one of the access points.

Figure 2:
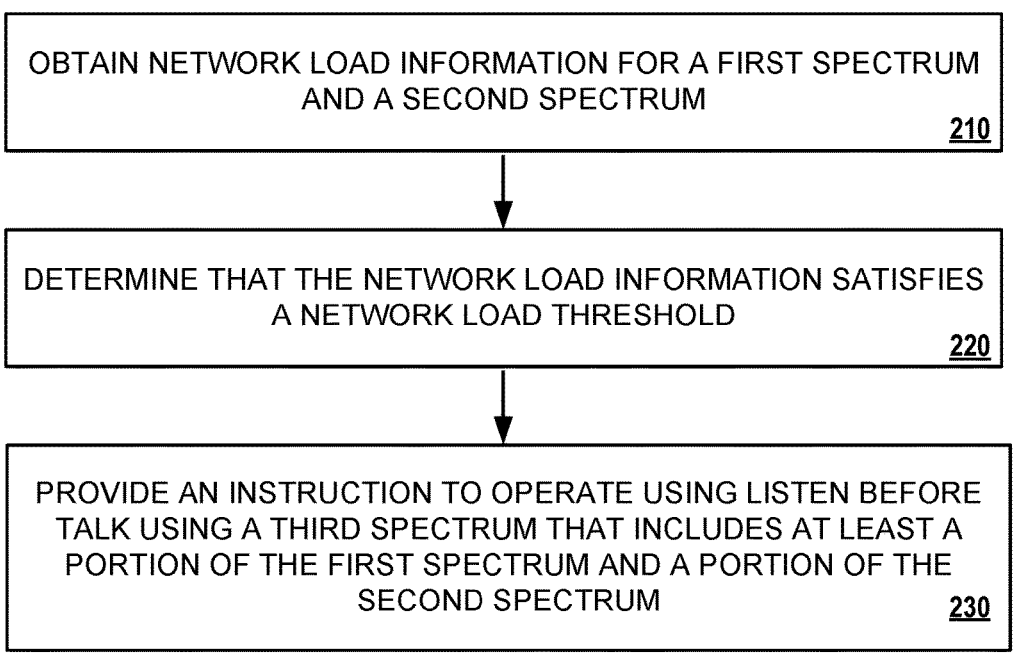
FIG. 2 is a flow diagram of an example process for switching between transmission technologies within a spectrum based on network load.

FIG. 2 is a flow diagram of an example process 200 for switching between transmission technologies within a spectrum based on network load. For example, the process 200 may be performed by the spectrum controller 110.

The process 200 includes obtaining network load information for a first spectrum and a second spectrum (210). For example, the spectrum controller 110 may obtain network load information that indicates five percent of physical resource blocks for a frequency range of 3550-3649 GHz is used by the first access point 120 and eight percent of physical resource blocks for a frequency range of 3650-3700 GHz is used by the second access point 130.

The process 200 includes determining that the network load information satisfies a network load threshold (220). For example, the spectrum controller 110 may determine that five percent of physical resource blocks being used by the first access point 120 and eight percent of physical resource blocks being used by the second access point 130 are both individually less than a predetermined threshold of ten percent of physical resource blocks being used and, in response, determine that the network load information satisfies a network load threshold.

The process 200 includes providing an instruction to operate using LBT using a third spectrum that includes at least a portion of the spectrum and a portion of the second spectrum (230). For example, the spectrum controller 110 may provide a mode switch instruction to the first access point 120 to switch to using LBT in a frequency range of 3550-3700 GHz includes the entirety of the frequency range of 3550-3649 GHz used by the first access point 120 in TD-LTE and the frequency range of 3650-3700 GHz used by the second access point 130 in TD-LTE.

Figure 3:
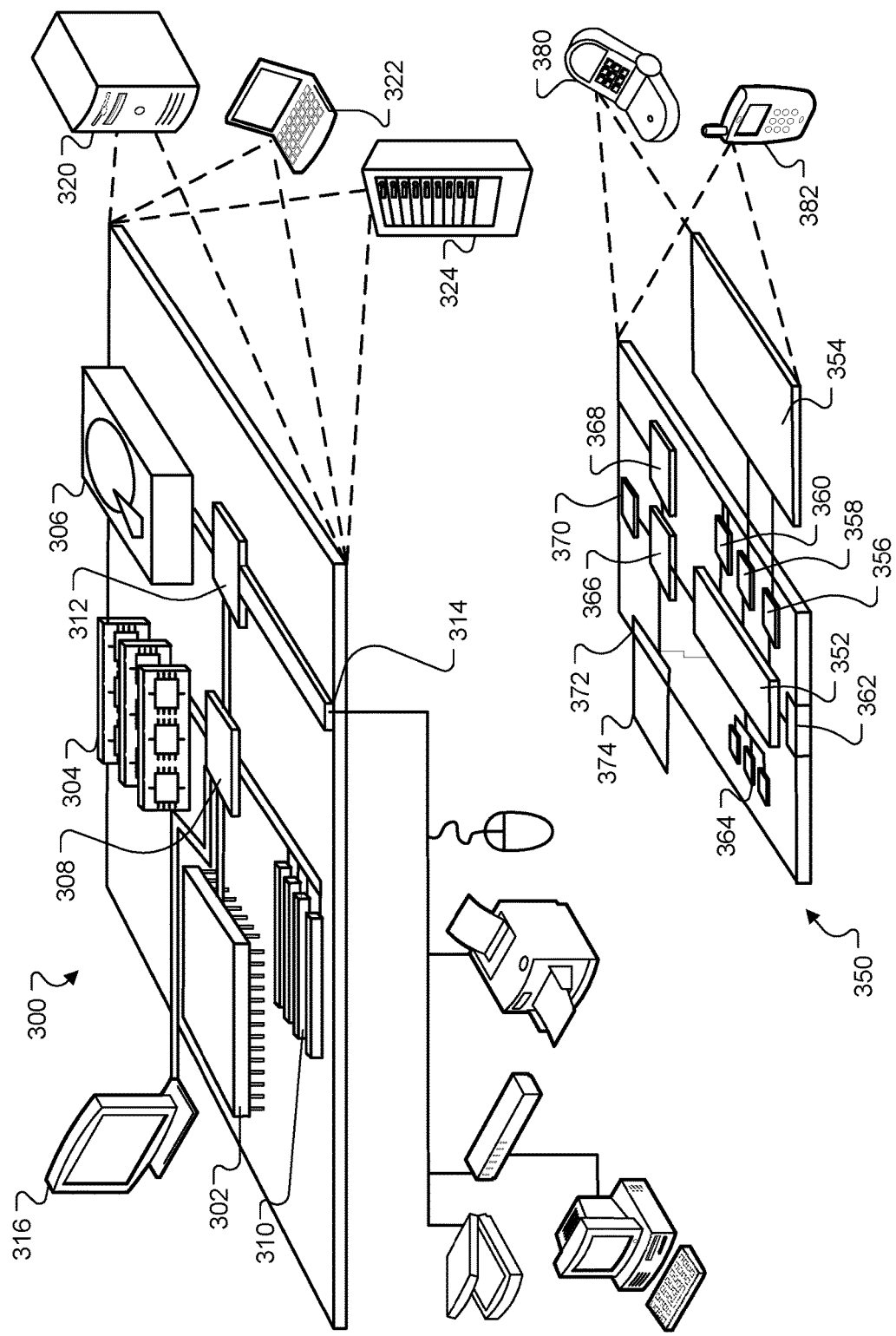
FIG. 3 is a block diagram of a computing system that can be used in connection with computer-implemented methods described in this specification.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   obtaining first network load information of a first access point operating using frequency domain multiplexing in a first spectrum;
   obtaining second network load information of a second access point using frequency domain multiplexing in a second spectrum that does not overlap any portion of the first spectrum;
   determining if at least one of the first network load information or the second network load information satisfies a network load threshold; and
   in response to determining that the network load threshold is satisfied, providing an instruction to the first access point to operate using listen before talk (LBT) in a third spectrum that includes at least a portion of the first spectrum and at least a portion of the second spectrum.

2. The method of claim 1, wherein determining if at least one of the first network load information or the second network load information satisfies the network load threshold comprises:
   determining a number of devices connected to the first access point; and
   determining that the number of devices connected to the first access point satisfies a predetermined number.

3. The method of claim 1, wherein determining if at least one of the first network load information or the second network load information satisfies the network load threshold comprises:
determining that a utilization of physical resource blocks satisfies a predetermined percentage.

4. The method of claim 1, wherein determining if at least one of the first network load information or the second network load information satisfies the network load threshold comprises:
determining that utilization of a physical downlink control channel satisfies a predetermined percentage.

5. The method of claim 1, wherein the third spectrum comprises:
an entirety of the first spectrum and the second spectrum.

6. The method of claim 1, wherein the third spectrum comprises frequencies between 3550 GHz and 3700 GHz.

7. The method of claim 1, wherein using frequency domain multiplexing comprises using TD-LTE.

8. The method of claim 1, wherein the first access point is operated by a first carrier and the second access point is operated by a second carrier.

9. The method of claim 1, comprising:
providing an instruction to the second access point to operate using LBT in the third spectrum.

10. The method of claim 9, further comprising:
obtaining third network load information of the first access point operating using LBT in the third spectrum;
obtaining fourth network load information of the second access operating point using LBT in the third spectrum;
determining if at least one of the third network load information or the fourth network load information satisfies a second network load threshold; and
in response to determining that the second network load threshold is satisfied, providing a second instruction to the first access point to operate using frequency domain multiplexing in the first spectrum.

11. The method of claim 10, wherein determining if at least one of the third network load information or the fourth network load information satisfies the second network load threshold comprises:
determining a number of devices connected to the first access point; and
determining that the number of devices connected to the first access point satisfies a predetermined number.

12. The method of claim 10, wherein determining if at least one of the third network load information or the fourth network load information satisfies the second network load threshold comprises:
determining that a utilization of physical resource blocks satisfies a predetermined percentage.

13. The method of claim 10, wherein determining if at least one of the third network load information or the fourth network load information satisfies the second network load threshold comprises:
determining that packet collision probability satisfies a predetermined probability.

14. The method of claim 10, wherein determining if at least one of the third network load information or the fourth network load information satisfies the second network load threshold comprises:
determining that packet random backoff satisfies a predetermined length of time.

15. The method of claim 1, wherein using LBT comprises using Carrier Sense Multiple Access (CSMA).

16. A system comprising:
a data processing apparatus; and
a non-transitory computer readable storage medium in data communication with the data processing apparatus and storing instructions executable by the data processing apparatus and upon such execution cause the data processing apparatus to perform operations comprising:
obtaining first network load information of a first access point operating using frequency domain multiplexing in a first spectrum;
obtaining second network load information of a second access point using frequency domain multiplexing in a second spectrum that does not overlap any portion of the first spectrum;
determining if at least one of the first network load information or the second network load information satisfies a network load threshold; and
in response to determining that the network load threshold is satisfied, providing an instruction to the first access point to operate using listen before talk (LBT) in a third spectrum that includes at least a portion of the first spectrum and at least a portion of the second spectrum.

17. The system of claim 16, wherein determining if at least one of the first network load information or the second network load information satisfies the network load threshold comprises:
determining a number of devices connected to the first access point; and
determining that the number of devices connected to the first access point satisfies a predetermined number.

18. The system of claim 16, wherein determining if at least one of the first network load information or the second network load information satisfies the network load threshold comprises:
determining that a utilization of physical resource blocks satisfies a predetermined percentage.

19. The system of claim 16, wherein determining if at least one of the first network load information or the second network load information satisfies the network load threshold comprises:
determining that utilization of a physical downlink control channel satisfies a predetermined percentage.

20. A non-transitory computer readable storage medium storing instructions executable by a data processing apparatus and upon such execution cause the data processing apparatus to perform operations comprising:
obtaining first network load information of a first access point operating using frequency domain multiplexing in a first spectrum;
obtaining second network load information of a second access point using frequency domain multiplexing in a second spectrum that does not overlap any portion of the first spectrum;
determining if at least one of the first network load information or the second network load information satisfies a network load threshold; and
in response to determining that the network load threshold is satisfied, providing an instruction to the first access point to operate using listen before talk (LBT) in a third spectrum that includes at least a portion of the first spectrum and at least a portion of the second spectrum.

\* \* \* \* \*

UNITED STATES PATENT AND TRADEMARK OFFICE
CERTIFICATE OF CORRECTION

PATENT NO. : 10,524,266 B2  
APPLICATION NO. : 15/788948  
DATED : December 31, 2019  
INVENTOR(S) : Jibing Wang Page 1 of 1

It is certified that error appears in the above-identified patent and that said Letters Patent is hereby corrected as shown below:

In the Claims

Column 13, Line 23, in Claim 9, after "1," before "comprising:" insert --further--

Column 13, Line 30, in Claim 10, after "operating" before "using" delete "point"

Column 13, Line 30, in Claim 10, after "access" before "operating" insert --point--

Signed and Sealed this  
Eleventh Day of February, 2020

Andrei Iancu  
*Director of the United States Patent and Trademark Office*